Nov. 3, 1964 — C. A. CRESWELL — 3,154,961
DRIVE BELTS
Filed July 31, 1962 — 2 Sheets-Sheet 1
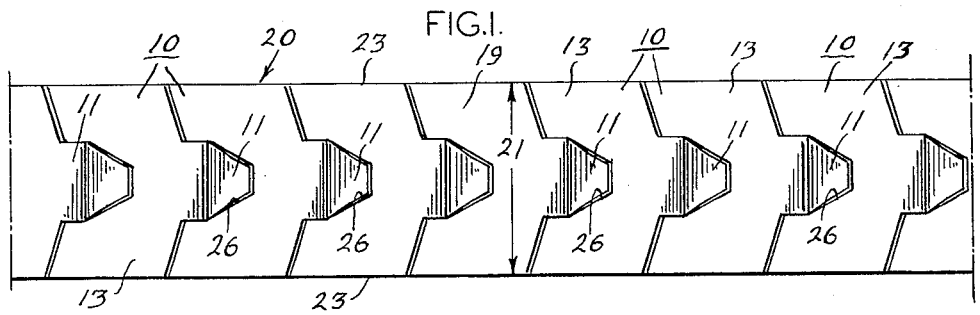
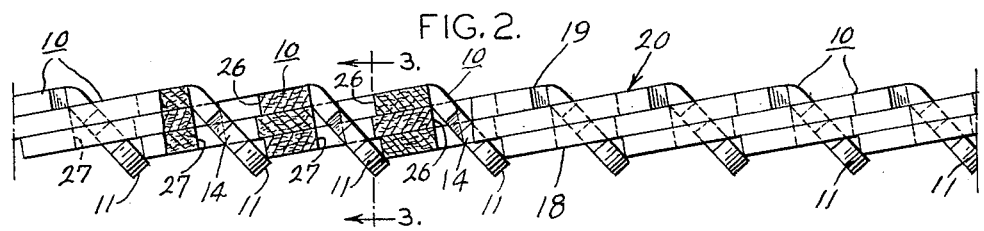
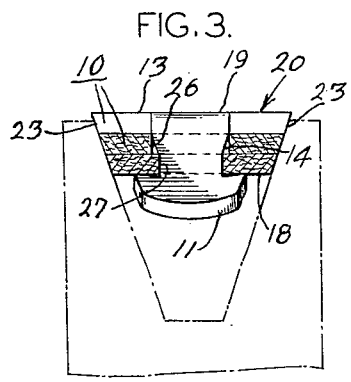
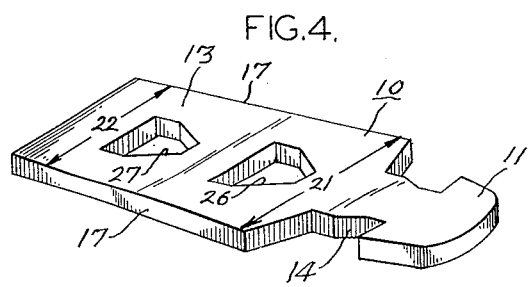
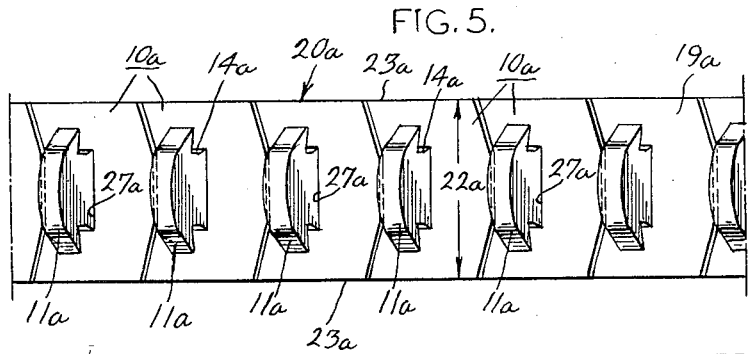
INVENTOR:
CLIFFORD A. CRESWELL
BY Howson & Howson
ATTYS.

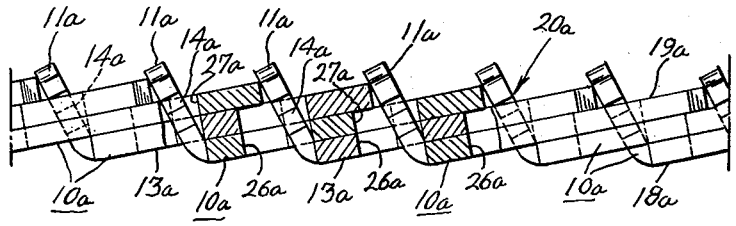
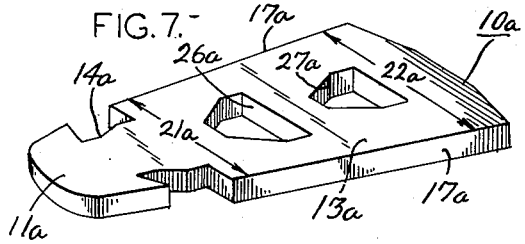
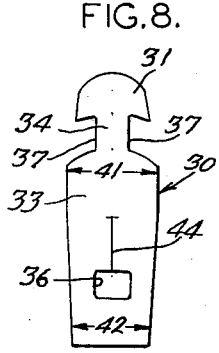
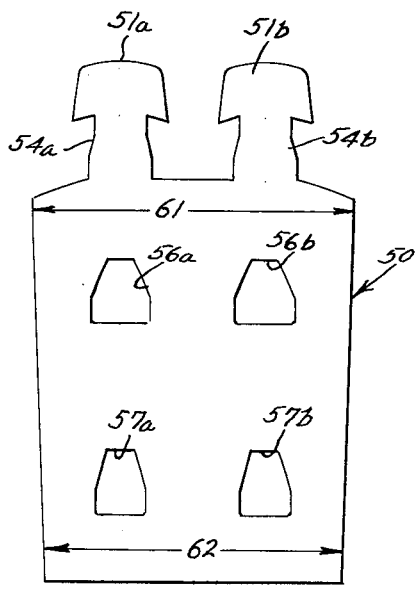
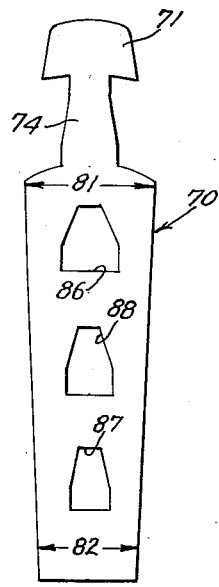

United States Patent Office 3,154,961
Patented Nov. 3, 1964

3,154,961
DRIVE BELTS
Clifford A. Creswell, Lancaster, Pa., assignor to The Arbee Corporation, Manheim, Pa., a corporation of Pennsylvania
Filed July 31, 1962, Ser. No. 213,667
7 Claims. (Cl. 74—234)

The present invention relates to new and useful improvements in belts and more particularly belts of a type comprising a number of superimposed links secured together by fastening means which pass through openings formed in the links.

While the present invention has particular application to V-belts for use in either constant or variable speed transmissions, it also has application in those situations requiring flat belts for drive purposes. Further, the appearance of the belt is by no means unpleasant to the eye, and, if constructed from suitable materials the construction may be used in other belts.

Prior to this invention, belts of this type, designed for driving heavy loads and for intermediate and variable speed transmissions, were thought best to be composed of separate lengths of tough material, with the separate links secured to each other by metal fasteners such as rivets. However, there are inherent disadvantages in using metal to secure links to each other.

One such disadvantage is the possibility of the belt bottoming in the metal pulley sheave while running, the frictional engagement between the pulley sheave and fasteners resulting in sparks which may be dangerous in an atmosphere containing combustible gases. Another disadvantage in using metal fastening devices is that metal tends to corrode in acid atmospheres. Further, where the fasteners securing the adjacent links are metal, the metal acts as a heat sink and does not conduct the heat away at the desired rate for cool running of the V-type belt, thus shortening the life of the belt. Another disadvantage of employing metallic fastening devices is that in most instances when securing the links together to form a belt, special accessory tools are required to secure the fastening devices.

With the foregoing in mind, a primary object of the present invention is to provide link fastening means which are integral with and composed of the same material as the link, allowing easy fabrication of an interlocking segmented belt and eliminating entirely the necessity for separate metallic fastening means and special accessory tools to secure the fastening means.

Another object of the present invention is to provide an interlocking segmented belt which can be made endless and in which a link may be inserted or removed at any point to lengthen or shorten the belt.

Another object of this invention is to provide an interlocking segmented belt of a form which can be easily trimmed along the outside edge to any desired width and angle thereby making it adaptable to any standard V-groove sheave and to any variable speed pulley arrangement.

And yet another object of this invention is to provide an interlocking segmented belt which by the nature of the elastomer and fabric used, whether it be natural or synthetic, is made static conducting, and/or resistant to atmospheres of a highly acid or alkaline nature, and/or is resistant to deterioration by lubricating and process oils.

A further object of this invention is to provide an interlocking segmented belt with open passages therethrough thereby effecting cooling which allows the belt to be run at higher ambient temperatures without adversely affecting the elastomeric properties of the belt and thereby increasing substantially, the life of the belt.

Another object of the invention is to provide an interlocking segmented belt with reduced mass per unit length which in turn reduces vibration transmitted throughout the power transmission unit as well as the apparatus being driven, and allows for higher peripheral speeds because of the reduced mass per unit length.

A further object of this invention is to provide an interlocking segmented belt which by nature of its open passages does not trap air and thereby reduces the noise level at high peripheral speeds.

Other objects and a fuller understanding of the invention may be had by referring to the following description and claims taken in conjunction with the accompanying drawings in which:

FIG. 1 is a plan view of one form of the belt embodying the present invention;

FIG. 2 is a side elevational view of the belt shown in FIG. 1 with portions broken away to show details of the construction of the belt;

FIG. 3 is a transverse sectional view taken on the line 3—3 of FIG. 2 showing a sheave in broken lines to illustrate the operation of the belt.

FIG. 4 is a perspective view of a link of the belt shown in FIGS. 1 and 2.

FIG. 5 is a plan view of another form of belt in accordance with the present invention;

FIG. 6 is a side elevational view of the belt shown in FIG. 5 with portions broken away to show details of the construction of the belt;

FIG. 7 is a perspective view of a link of the belt shown in FIGS. 5 and 6; and

FIGS. 8, 9 and 10 are views of links of belts embodying the invention in different forms.

Referring now to the drawing and more particularly to FIGS. 1 and 2, thereof, the belt 20 comprises a plurality of superimposed links 10 joined together by integral fastening means. Each fastening means comprises a locking tab 11 joined to the body 13 of the link 10 through a constricted neck 14. As illustrated in FIGS. 2 and 3, the locking tab 11 is spaced a sufficient distance apart from the body 13 to receive therebetween two of the links 10.

A similar belt 20a is shown in FIGS. 5 and 6. As the link configuration of the belt 20a as shown in FIG. 7 is similar to that shown in FIG. 4, the numbers used in FIGS. 4 and 7 are identical except that those in FIG. 7 are suffixed with a small letter "a." It should be understood that the following discussion of the operation and forms of the belt 20 are also generally applicable to the belt 20a.

The links 10 are provided with registering apertures for receiving the locking tabs 11 and the neck 14 of preceding links 10 as they are assembled in superimposed relation. As shown in FIG. 4 the links 10 are provided with forward apertures 26 and trailing apertures 27. When the links are assembled in successive superimposed overlapping relation, the trailing aperture 27 is in registry with the forward aperture 26 of the adjacent link, so that the locking tab 11 of the overlapping link first passes through the forward aperture 26 of the adjacent link and then through the trailing aperture 27 of the innermost link, and then bears against the inner surface of the innermost link. For ease of belt assembly, both of the apertures are longer in the axial direction than they are wide so that the locking tab 11 of the link to be assembled in superimposed relation, when twisted so as to align axially with the apertures, will more easily pass through the apertures. When the locking tab 11 is released from its twisted position, it aligns cross-wise with the belt 20 in a position perpendicular to the longitudinal axis of the links 10 and since the width of the apertures is less than the length, the locking tab 11 is unable to pass through the apertures and thus is locked in position against the inner surface of the innermost link as shown in FIG. 3.

As previously stated, FIGS. 4 and 7 show two different forms of the link as they appear in their respective belt forms as is illustrated in FIGS. 1 and 5. FIG. 3 shows the preferred embodiment of the belt, with locking tab 11 on the inner periphery 18, when in operation in a typical V-belt sheave. Alternatively, FIGS. 5 and 6 show an alternate form of the belt 20a wherein the integral locking tabs 11a ride on the outer periphery 19a of the belt. The difference between the forms exhibited in FIGS. 4 and 7 is that in the belt 20 with the locking tab 11 on the inner periphery 18, the head portion 21 of the link 10 is wider than the tail portion 22, thus facilitating the natural curvature of the superimposed links 10 by placing the widest portion of the link 10 on the outer periphery 19 of the belt 20. Alternatively, as is illustrated in FIG. 7, in the belt 20a when the integral locking tabs 11a lie on the outer periphery 19a, the head portion 21a is not as wide as the tail portion 22a. In this embodiment the widest portion of the link 10a is the tail portion 22a which lies on the outer periphery 19a of the belt 20a, and as before, the longitudinal centerline of the belt tends to curve convexly. Thus by making the head portion wider than the tail portion, or vice versa, depending upon whether the locking tabs lie on the inner or outer periphery of the belt, the longitudinal centerline of the links automatically assume a convex curvature upon assembly in successive superimposed overlapping relation.

As the locking tabs are passed through successive links and then terminate, their natural tendency when the belt is tensioned is to dispose themselves parallel to the link by flattening out. In the belt 20, when the tabs lie on the inner periphery 18 of the belt, the outer periphery 19 contains the head portion 21, and since the outer periphery 19 of the belt 20 is wider at any point than that portion of the adjacent or intermediate link, and the intermediate link in turn is wider at that point than the tail portion 22 of the innermost link, the belt assumes a V-shaped cross-section with the tab 11 in the apex of the V-shape, as illustrated in FIG. 3. Alternatively, in the belt 20a, when the integral locking tabs 11a lie on the outer periphery 19a of the belt 20a, since the outermost tail portion 22a is the widest portion of the link 10a, while the innermost portion is the narrow head portion 21a of the adjacent link, the belt 20a also assumes a V-shape section, but with the tab 11a disposed opposite the apex of the V-shape.

Despite the fact that the superimposed links are generally V-shaped in cross-section, the edges 17 and 17a of the V would appear to be stepped. Therefore, in the final form and after assembly, the edges of the links are trimmed to insure proper seating in the associated sheaves. FIG. 3 illustrates, as an example, the trimmed edge appearing on the belt 20. Of course, the link edges 17 and 17a may be trimmed individually prior to assembly, or may initially be formed with their edges beveled so that when assembled into a belt, the belt will seat neatly in a V-type sheave.

Further, the plan view of the belt, as illustrated in FIGS. 1 and 5, shows the outer edges 23 and 23a completely straight or parallel after assembly of the links. Normally, however, when the links are formed into belts 20 and 20a, the outer edges 23 and 23a may be somewhat uneven. Therefore the outer edges of the belts shown in FIGS. 1 and 5 have been trimmed so as to be straight or parallel.

The present link design lends itself to this trimming operation more easily than link belts which use metal fasteners which project from both sides of the belt, because the belt of the present invention is substantially flat on one side which allows the belt to lie flat for the trimming operation. Thus, this novel link design allows for a parallel outer edge trimming operation which is extremely important in the instances where two or more belts are used on a multiple grooved sheave to insure that the outer edges 23 or 23a of the belt will not come in contact with each other as they pass around the sheave.

The form of the link 30 shown in FIG. 8 is much the same as the forms illustrated in FIG. 4 and 7. One difference is that in the form illustrated in FIG. 8, only one aperture 36 is shown and therefore, the thickness of a belt comprising superimposed links 30, is equal to only one link thickness. Further, the aperture 36 is oriented so that it is narrower in the longitudinal direction than it is in width. With orientation of the aperture 36 in the illustrated direction it was discovered that when the links 30 were assembled into a belt, with each link having a single aperture, the locking tab 31 of the preceding link 30 being the only locking tab through the link 30, the link was not able to twist about the neck 34 of the preceding link 30. In this construction, the aperture 36 is wider in a direction perpendicular to the longitudinal axis so that it engages the neck along its edges 37, and narrower in the longitudinal direction to restrict movement of the neck 34 in that direction.

In the illustrated embodiment, to allow for insertion of the locking tab 31 of the preceding link 30, a slit 44 is made in the body 33 parallel to the longitudinal axis of the link 30 and extending from the aperture 36 towards the locking tab. In the form shown, since the head portion 41 is wider than the tail portion 42, the locking tabs 31 lie on the inner periphery of the belt. Alternatively, if the head portion 41 were narrower than the tail portion 42 the locking tabs 31 would lie on the outer periphery of the belt in the same manner as those illustrated in FIG. 6.

Referring now to FIG. 9, in certain applications where a heavier V-belt than heretofore described is desired, a belt, comprising superimposed links 70, may be used. By including a forward aperture 86, a trailing aperture 87, and an intermediate aperture 88 the belt thickness is increased to three layers. The neck 74 is formed one link-thickness longer in the axial direction than those links illustrated in FIGS. 4 and 7, because in assembly the locking tab 71 passes through three links 70 rather than two. Again, when the links are assembled in superimposed fashion to form a belt, if the head portion 81 of the link is wider than the tail portion 82, the locking tab 71 will lie on the inner periphery of the belt and alternatively if the head portion 81 were narrower than the tail portion 82 the locking tabs 71 would lie on the outer periphery of the belt.

The form of link 50 as illustrated in FIG. 10, is substantially that of joining two links 10 similar to that shown in FIG. 4, in edge to edge relationship. Thus the link 50 comprises two integral locking tabs 51a and 51b joined to the body of the link 50 through separate necks 54a and 54b. Further, the body of the link 50 has four apertures. Two of the apertures, 56a and 57a are aligned along the longitudinal axis of the locking tab 51a and the remaining two apertures 66b and 67b are approximately aligned along the longitudinal axis of the locking tab 51b. Of course the number of apertures could be increased or decreased along with an associated increase or decrease in neck length, for example as joining two links 30 or two links 70 in edge to edge relationship.

When the links 50 are fashioned to form a belt in the same manner as has previously been explained, the belt has particular application for use in heavy power transmission and load work where a wide belt is required for use in wide pulleys. Similar to the belt forms previously illustrated, since the form of the link 50 shown in FIG. 10 has a head portion 61 wider than the tail portion 62, the locking tabs 51 lock on the inner periphery of the belt. Alternatively, if the head portion 61 were narrower than the tail portion 62, the locking tabs 51 would lie on the outer periphery of the belt.

Prior to the present invention, and in wide use today are link-type belts employing metal fastening means.

Where links are joined by metal fasteners to form a belt, most links are constructed of cotton fabric and neoprene elastomers. This material in itself is oil resistant and to some extent alkali resistant, but because the cotton fabric is used to reinforce the individual link, it cannot be made acid resistant. Furthermore it is pointless to make the links acid resistant because the steel fasteners, such as washers and rivets, will corrode in a very short time. Of course stainless steel rivets or fasteners will perform satisfactorily but the cost of stainless steel is prohibitive. In the present invention metallic fastening means have been eliminated which permits the fabrication of a link-type belt with excellent corrosion resistant characteristics against chemical atmospheres. Thus the link-belt of the present invention may be composed of, for example, an acid resisting synthetic material comprising a polyester fabric such as Dacron, and a properly compounded synthetic material such as neoprene, butyl, nitrile, Penton and certain urethane elastomers.

Further, due to the fixed dimension of the rivet system where rivets are used as fasteners, the material used in formation of a belt must conform to very close thickness tolerances. In the present invention, which utilizes no metal fasteners of any kind, this close tolerance is not required. Thus, this invention is a practical approach to the use of a variety of materials without demanding close thickness tolerances.

Some difficulty was encountered in the prior art because of air entrapment under the belt as it passed around the pulley. One solution to this problem was illustrated in the U.S. Patent to Groff, No. 2,848,901, wherein separate registering holes are placed in the links forming a belt, to afford adequate venting. The present invention affords venting through the apertures remaining unfilled as the neck of the preceding link extends through the apertures. This feature is best illustrated in FIGS. 2 and 6 wherein the neck 14, as it extends through the forward aperture 26 of the succeeding link 10, and then through the tail aperture 27 of the next succeeding link, does not fill the aperture but leaves a passageway through which entrapped air may vent. Thus the present invention permits air to escape by providing means for venting from under the belt as it is trained about the pulley. A further advantage of this venting feature is that at high peripheral speeds, the reduction in air entrapment reduces the noise level.

The invention herein described is a major step in advancing the art of link-type belts. By eliminating the metallic fastener, the mass of the belt is greatly reduced allowing higher peripheral speeds for driving purposes as well as causing a reduction in transmitted vibration between the drive unit and the driven unit. The elemination of metallic fasteners also makes possible the utilization of many different materials in the link belt so that it may be used in varying chemical atmospheres, and, being composed of uniform material wtihout metal fasteners of any kind, may be made static conducting. Further, the particular design of the belt lends itself to ease of trimming insuring a better fit in the pulley sheave. At the same time the design of the links affords venting of the belt as it trains about the pulley, insuring a proper fit in the pulley as well as decreasing the noise level.

Although the invention has been described with a certain degree of particularity, it is understood that the present disclosure has been made only by way of example and that numerous changes and details of construction and the combination and arrangement of parts may be made without departing from the spirit and the scope of the invention, as hereinafter claimed.

I claim:

1. An endless belt comprising a plurality of links arranged in superimposed successive overlapping relation, each of said links having a longitudinally tapered body portion and at least two longitudinally aligned apertures, an integral fastening means comprising a constricted neck portion and a locking tab connected to said body portion through said neck portion, said integral fastening means composed of the same material as the link and longitudinally aligned with said apertures, said integral fastening means extending through a forward aperture in the succeeding link, and a trailing aperture in the next succeeding link whereby said plurality of links are secured together in overlapping relation to thereby form an endless belt.

2. A belt according to claim 1, wherein the widest portion of each link is adjacent to the integral fastening means so that the belt comprising a plurality of said links is substantially V-shape in transverse cross section with the locking tab disposed within the apex of the V-shape.

3. A belt according to claim 1, wherein the narrowest portion of each link is adjacent to the integral fastening means so that the belt comprising a plurality of said links is substantially V-shape in transverse cross section with the locking tab disposed opposite the apex of the V-shape.

4. A belt comprising a plurality of links arranged in superimposed successive overlapping relation, each of said links having a body portion and an integral fastening means at one end thereof comprising a locking tab and a constricted neck portion, said neck portion connecting the locking tab to the body portion, said body portion containing one aperture, said aperture being wider in a direction perpendicular to the longitudinal axis of the link than in a direction along said axis, said constricted neck portion being wider in a direction perpendicular to the longitudinal axis of the link than said aperture in a direction along said axis, said integral fastening means being composed of the same material as the link, means defining a slit in the body portion of said link extending longitudinally from said aperture towards said one end to facilitate passage of said integral fastening means through the aperture in the next succeeding link whereby said neck portion extends through said aperture in the succeeding link and terminates thereafter in said locking tab securing said plurality of links together in overlapping relation.

5. A belt comprising a plurality of links arranged in superimposed successive overlapping relation, each of said links having a body portion, integral fastening means comprising a pair of locking tabs and a pair of constricted necks respectively connecting said locking tabs to said body portion, said body portion having two forward apertures and two trailing apertures, one forward and one trailing aperture being in longitudinal axial alignment with one neck of said integral fastening means, the other forward and trailing aperture in longitudinal axial alignment with the other neck of said integral fastening means, said integral fastening means being composed of the same material as the link, said neck portions extending through the trailing aperture in the succeeding link aligned therewith, the forward aperture in a subsequent link aligned therewith, and terminating thereafter in said locking tab securing said plurality of links together in overlapping relation.

6. A belt comprising a plurality of links arranged in superimposed successive overlapping relation, each of said links having a body portion and integral fastening means comprised of a locking tab and a constricted neck portion, said constricted neck portion connecting said locking tab to the body of said link, said body portion having forward, trailing, and intermediate longitudinally aligned apertures, said integral fastening means composed of the same material as the link and longitudinally aligned with said apertures, said neck portion extending through said forward aperture of the succeeding link, said intermediate aperture of the next succeeding link, said trailing aperture of the next succeeding link and terminating thereafter in said locking tab securing said plurality of links in overlapping relation.

7. An endless belt comprising a plurality of links arranged in superimposed successive overlapping relation, each of said links having a body portion, an integral fastening means comprising a constricted neck portion and a locking tab connected to said body portion through said neck portion and integral therewith, said body portion having at least two apertures longitudinally aligned with said integral fastening means, said restricted neck portion extending through the forward aperture in the succeeding link, the trailing aperture in the next succeeding link and terminating thereafter in said locking tab securing said plurality of links together in overlapping relation.

References Cited in the file of this patent

UNITED STATES PATENTS

| | | |
|---|---|---|
| 1,382,888 | Brammer | June 28, 1921 |
| 1,580,998 | Crocker | Apr. 13, 1926 |
| 1,724,633 | Agrillo | Aug. 13, 1929 |
| 2,184,796 | Evans et al. | Dec. 26, 1939 |
| 2,969,686 | Runton | Jan. 31, 1961 |